US010888735B2

(12) United States Patent
Clark et al.

(10) Patent No.: US 10,888,735 B2
(45) Date of Patent: Jan. 12, 2021

(54) CALIBRATION OF INITIAL ORIENTATION AND POSITION OF SPORTS EQUIPMENT AND BODY SEGMENTS FOR INERTIAL SENSORS

(71) Applicants: William W. Clark, Wexford, PA (US); Minmin Zhang, Pittsburgh, PA (US); Michael Ressler, Pittsburgh, PA (US)

(72) Inventors: William W. Clark, Wexford, PA (US); Minmin Zhang, Pittsburgh, PA (US); Michael Ressler, Pittsburgh, PA (US)

( * ) Notice: Subject to any disclaimer, the term of this patent is extended or adjusted under 35 U.S.C. 154(b) by 364 days.

(21) Appl. No.: 15/727,133

(22) Filed: Oct. 6, 2017

(65) Prior Publication Data

US 2018/0154211 A1    Jun. 7, 2018

Related U.S. Application Data

(60) Provisional application No. 62/405,373, filed on Oct. 7, 2016.

(51) Int. Cl.
*A63B 24/00* (2006.01)
*A63B 60/46* (2015.01)
(Continued)

(52) U.S. Cl.
CPC ...... *A63B 24/0006* (2013.01); *A63B 24/0062* (2013.01); *A63B 60/46* (2015.10);
(Continued)

(58) Field of Classification Search
CPC ........ A63B 2024/0009; A63B 2102/18; A63B 2102/182; A63B 2220/40;
(Continued)

(56) References Cited

U.S. PATENT DOCUMENTS 5,486,001 A * 1/1996 Baker ................ A63B 24/0003
434/252
5,599,239 A * 2/1997 Kim .................. A63B 69/3608
473/208

(Continued)

OTHER PUBLICATIONS

King et al., A new technology for resolving the dynamics of a swinging bat, Feb. 2012, International Sports Engineering Association (Year: 2012).*

*Primary Examiner* — John Fitzgerald
*Assistant Examiner* — Truong D Phan
(74) *Attorney, Agent, or Firm* — Dentons Cohen & Grigsby P.C.

(57) ABSTRACT

A player calibrates the initial position and orientation of trajectory using their natural sports motion from a well-defined starting point. For example, a batter with mature swing mechanics maintains approximately the same bat orientation and position ("load configuration") at the beginning of their swing. This load configuration is unique to that player and unlike that of other players and may represent the start of a swing (or other motion of interest) or may occur at any characteristic point in time during the motion. Subsequent motion data within the spatial frame can be accurately analyzed so that three-dimensional trajectory of the equipment or body segment can be precisely determined and presented in an animated playing environment on devices such as smartphones, tablets and laptops.

16 Claims, 10 Drawing Sheets

(51) Int. Cl.
*G06N 20/00* (2019.01)
*G01C 25/00* (2006.01)
*A63B 102/18* (2015.01)
*A63B 69/36* (2006.01)

(52) U.S. Cl.
CPC .......... *G01C 25/005* (2013.01); *G06N 20/00* (2019.01); *A63B 69/36* (2013.01); *A63B 2024/0009* (2013.01); *A63B 2102/18* (2015.10); *A63B 2102/182* (2015.10); *A63B 2220/40* (2013.01); *A63B 2220/803* (2013.01); *A63B 2220/833* (2013.01); *A63B 2220/836* (2013.01); *A63B 2225/50* (2013.01)

(58) Field of Classification Search
CPC ........ A63B 2220/803; A63B 2220/833; A63B 2220/836; A63B 2225/50; A63B 24/0006; A63B 24/0062; A63B 60/46; A63B 69/0028; A63B 71/0686; A63B 69/0002; A63B 2069/0008; A63B 21/0552; A63B 69/36; A63B 24/0003; A63B 69/3608; G01C 25/005; G01C 25/00; G01C 9/06; G01C 22/006; G06N 20/00; G01P 21/00; G01P 15/125; G01P 15/18; G01P 15/0802; G01P 15/132; G01P 15/131; B25J 9/1692; G01B 21/042; B82Y 35/00; B81B 2201/0235; A63F 13/06; A63F 13/10; A63F 13/02; A63F 2300/64; G07F 17/3211
USPC ....... 73/1.38, 1.59, 1.78, 1.79, 1.81, 514.01, 73/514.24, 514.38, 493, 495, 510, 511; 377/24.2; 473/453; 434/252; 463/31, 36
See application file for complete search history.

(56) References Cited

U.S. PATENT DOCUMENTS

| | | | | |
|---|---|---|---|---|
| 7,018,211 | B1* | 3/2006 | Birkholzer | A63B 24/0003 434/247 |
| 7,021,140 | B2* | 4/2006 | Perkins | A01K 87/00 473/219 |
| 7,234,351 | B2* | 6/2007 | Perkins | A01K 87/00 473/219 |
| 7,881,902 | B1* | 2/2011 | Kahn | G01C 22/006 377/24.2 |
| 8,419,560 | B2* | 4/2013 | Amini | A63B 69/38 473/212 |
| 8,672,779 | B1* | 3/2014 | Sakyo | A63B 24/0006 473/223 |
| 8,944,939 | B2* | 2/2015 | Clark | A63B 71/0619 473/453 |
| 2002/0187846 | A1* | 12/2002 | Funk | A63B 24/0003 473/219 |
| 2005/0032582 | A1* | 2/2005 | Mahajan | A63B 69/00 473/222 |
| 2006/0063600 | A1* | 3/2006 | Grober | A63B 69/3638 473/224 |
| 2006/0247070 | A1* | 11/2006 | Funk | A63B 24/0003 473/222 |
| 2007/0298895 | A1* | 12/2007 | Nusbaum | A63B 69/36 473/131 |
| 2007/0298896 | A1* | 12/2007 | Nusbaum | A63B 69/36 473/131 |
| 2008/0098448 | A1* | 4/2008 | Mondesir | H04N 21/42201 725/126 |
| 2012/0221276 | A1* | 8/2012 | Schmidt | G01C 21/165 702/104 |
| 2012/0289296 | A1* | 11/2012 | Marty | G06K 9/00342 463/3 |
| 2013/0204411 | A1* | 8/2013 | Clark | A63B 71/0619 700/91 |
| 2016/0217325 | A1* | 7/2016 | Bose | G11B 27/17 |
| 2017/0120122 | A1* | 5/2017 | Hagiwara | A63B 60/46 |
| 2017/0203172 | A1* | 7/2017 | Ito | A63B 69/36 |

* cited by examiner

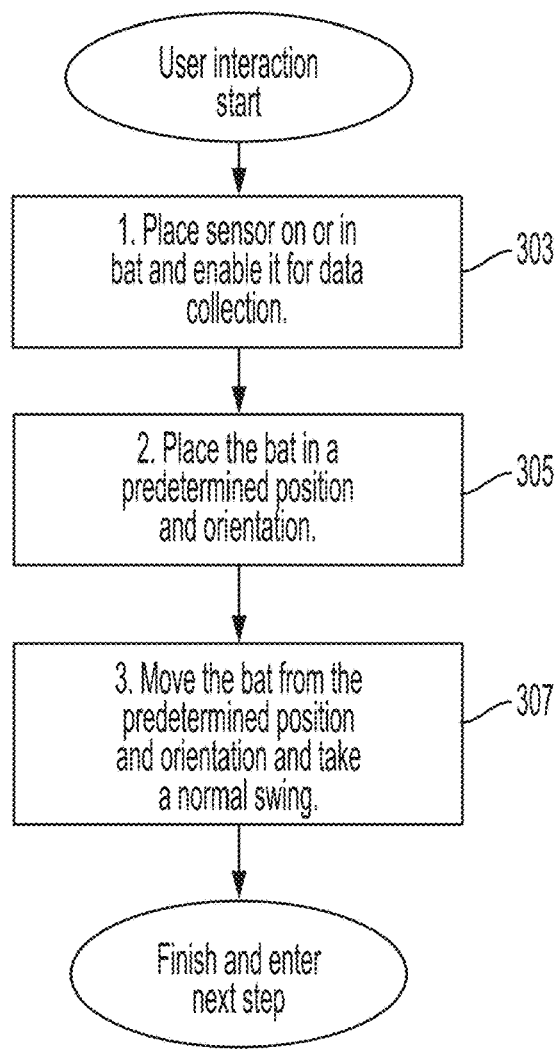
FIG. 3
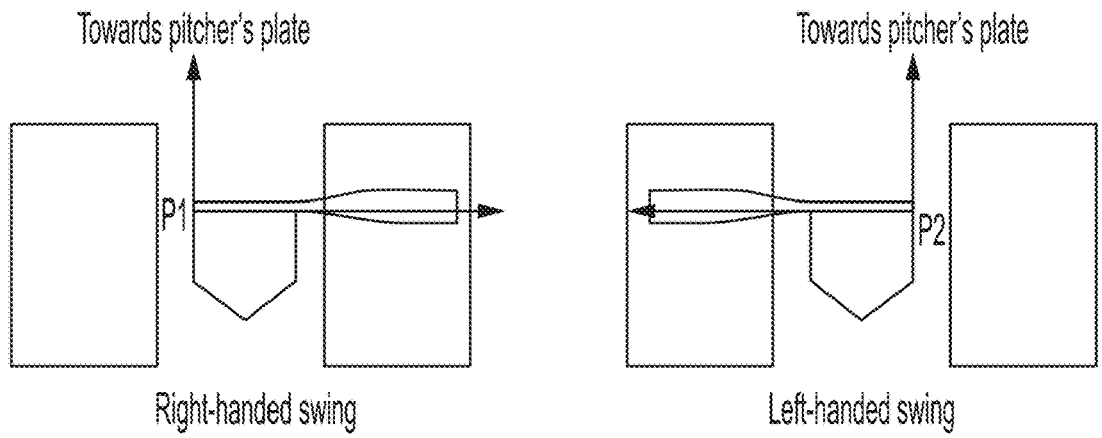
FIG. 4A  FIG. 4B

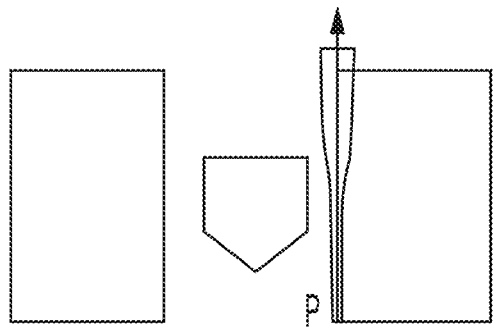
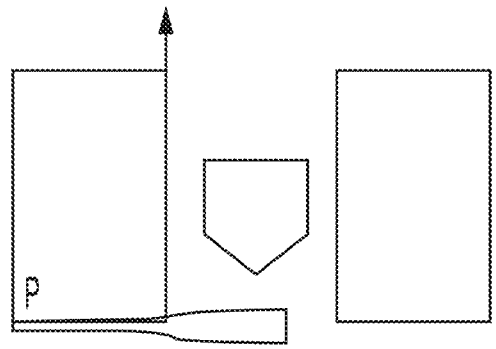
FIG. 5A  FIG. 5B
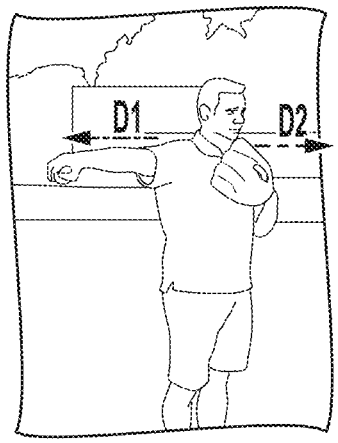
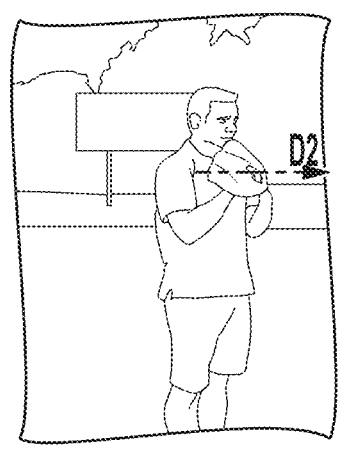
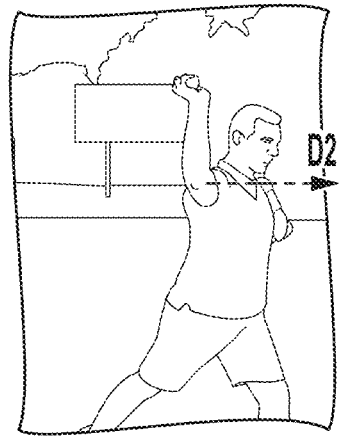
FIG. 6A  FIG. 6B  FIG. 6C

FIG. 9A
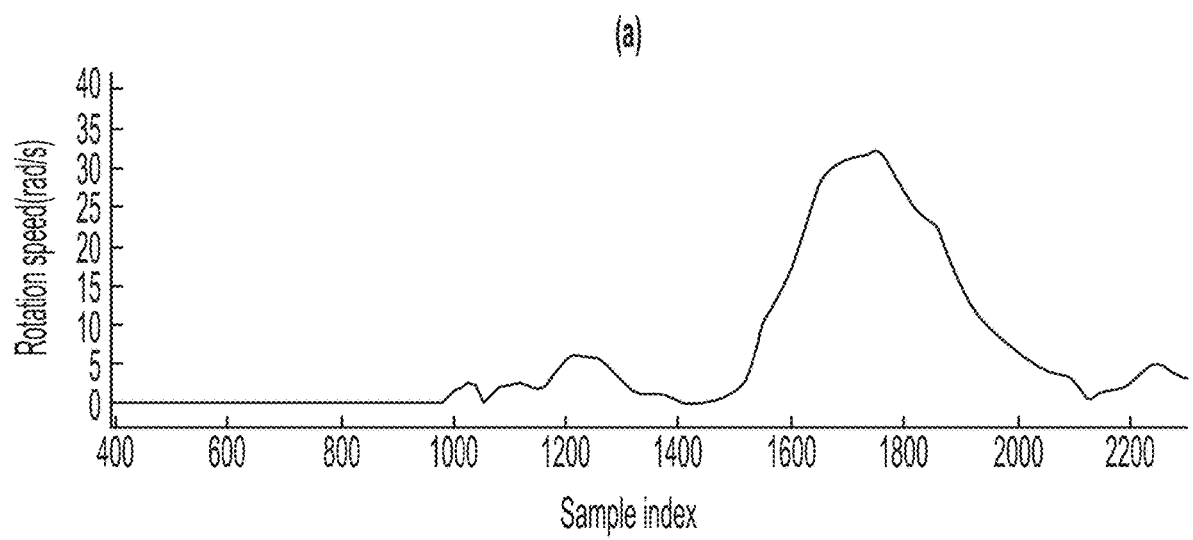
(a)
(b)
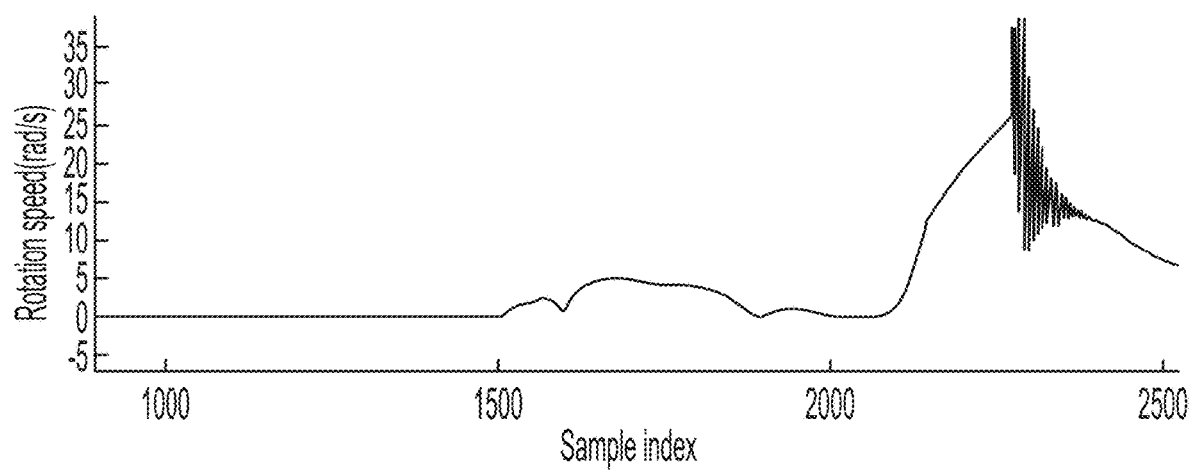
FIG. 9B

FIG. 10A
(a)
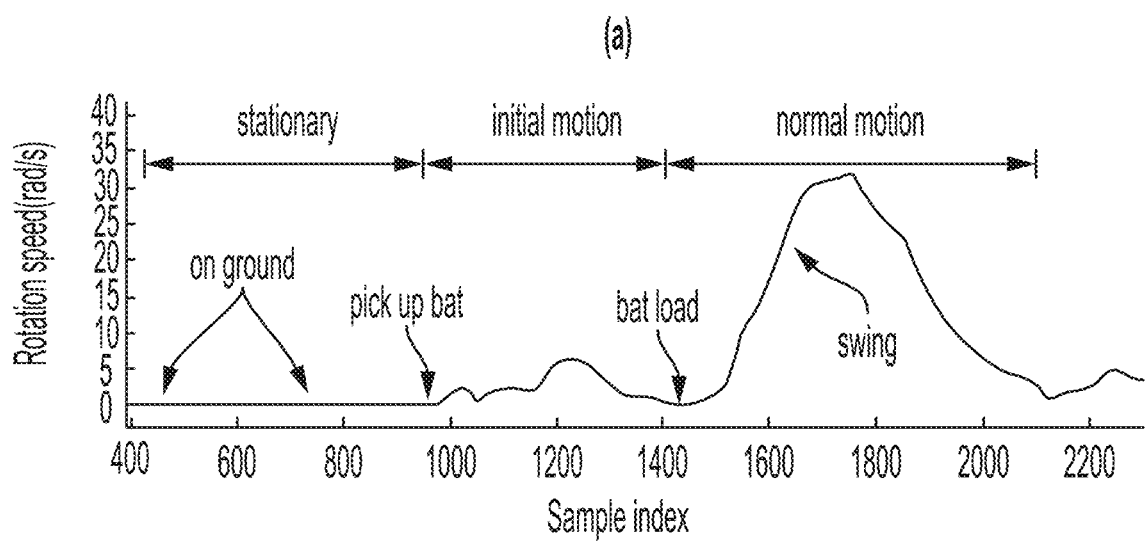
(b)
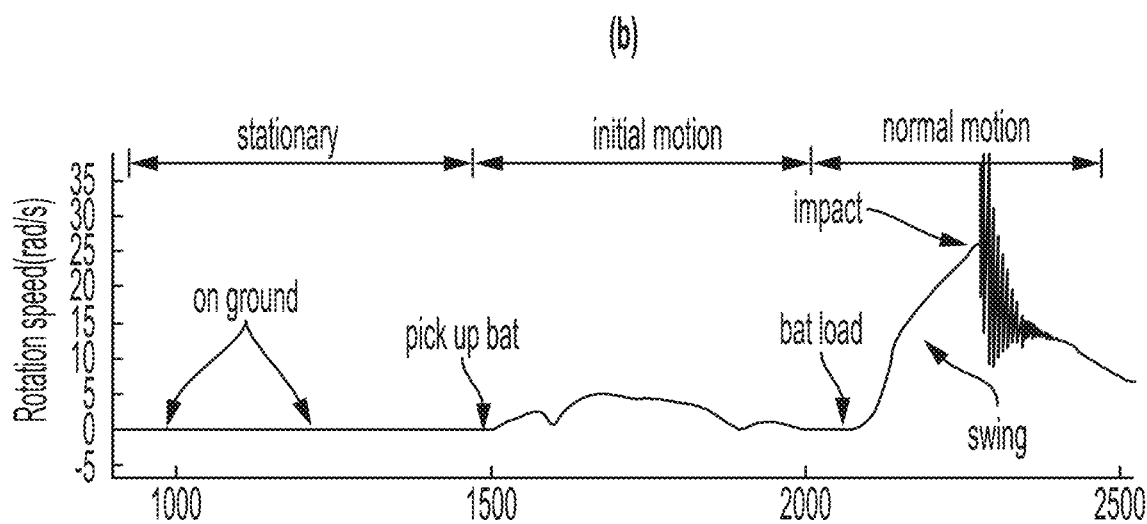
FIG. 10B

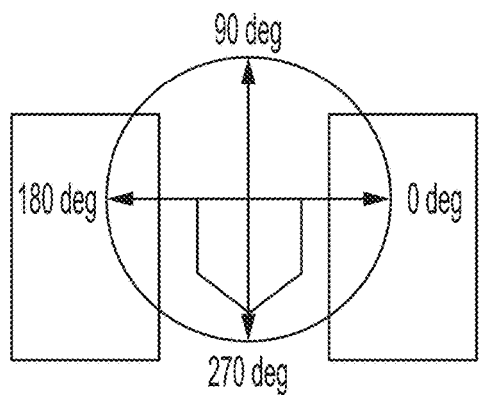
FIG. 11
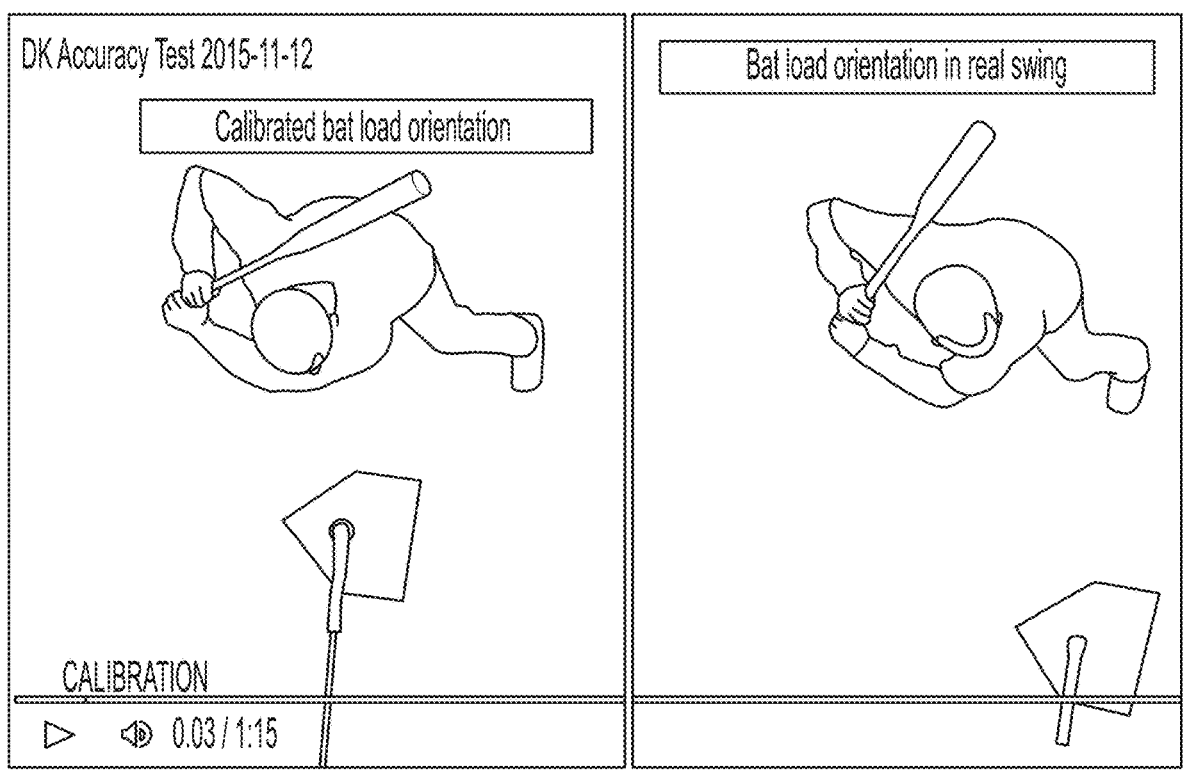
FIG. 12A  FIG. 12B

US 10,888,735 B2

CALIBRATION OF INITIAL ORIENTATION AND POSITION OF SPORTS EQUIPMENT AND BODY SEGMENTS FOR INERTIAL SENSORS

BACKGROUND OF THE INVENTION

Inertial sensor units are commonly used to measure the motion of sports equipment and human body segments during sports activities to provide quantitative performance evaluation. Typically, a prior art inertial sensor unit is a portable, rechargeable electronics unit that is equipped with one or more accelerometers, rate gyros, and/or magnetometers that measure linear acceleration, rotational velocity, and/or orientation with respect to one or more orthogonal axes.

The individual accelerometers, gyroscopes, and magnetometers may be contained in individual chips or may be packaged together in inertial measurement units (e.g. a combined three-axis accelerometer and rate gyro package). Typically, inertial sensors are equipped with a microcontroller, memory, and wireless communications functionality such that the data can be stored and transmitted to a receiver, such as a mobile phone or tablet computer. As used herein, the term "inertial sensor" means a system with some or all of the aforementioned components and functionalities. When attached to or embedded in an article of sports equipment (e.g. a baseball or softball bat) or to a body segment of a sports participant (e.g. the forearm) an inertial sensor may detect movement of the article or body segment during a typical sports motion, measure that motion, store the motion data, and transmit the data to a receiving device.

An associated motion analysis algorithm (that may be executed in the sensor unit firmware, mobile device, or on a server) may reconstruct the motion in a three dimensional Marked-Up Specification space. One example of this application is the SwingTracker™ sensor and mobile application bundle that is commercially available from Diamond Kinetics Inc.

To reconstruct a body's motion in 3-dimensional space, six quantities must be determined for each point in time. For example, position is expressed in three axes of the global or spatial frame (denoted as X-Y-Z) and orientation is expressed in Euler angle sequence roll-pitch-yaw (denoted as $\phi$-$\theta$-$\psi$). (Yaw angle is sometimes also referred to as "heading angle.") This combination of position and orientation is referred to as a configuration for a given point in time. A series of such configurations composes a three-dimensional ("3D") trajectory (such as a bat or body segment moving through space).

Accelerometers and rate gyros measure change in velocity or angle. Therefore, initial conditions, including initial position and initial orientation, must be determined to accurately render the 3D trajectory. The term "initial conditions" as used herein does not necessarily refer to the initial point in time of the motion. Known methods are available to calculate the sensor's positions and orientations forward or backward in time from a given "initial" point. The important concept is that position and orientation relative to a spatial frame must be known for some point of time during the period of data capture. Initial roll and pitch angles can be determined by accelerometer signals while the sensor is stationary. However, four remaining initial quantities are still unknown: position on three axes and heading angle. Deficiency of that information results in unreliable or inaccurate orientation and position in a 3D rendering of the equipment or body segment's trajectory in the global or spatial frame. For example, in a baseball swing a bat-ball collision could result in a ball being hit along the third base line. However, without information as to initial orientation the 3D reconstruction could demonstrate an incorrect swing that creates a hit down the first base line. Another example of defective 3D reconstruction or development is seen when there are players of materially different heights because a 6'7" tall baseball player has a much higher starting bat position than a player who is 5'0" tall.

Past methods have only partially compensated for such shortcomings. One method has required each player to start the motion with the article or body segment in the same pre-defined position and orientation. For example, one prior method starts motion capture of a baseball swing using an inertial sensor unit with the bat placed in a known orientation as shown in FIG. 1. See King, K., Hough, J., McGinnis, R., & Perkins, N. C. (2012). "A new technology for resolving the dynamics of a swinging bat." *Sports Engineering*, 15(1), 41-52. The batting tee is oriented such that its edges are aligned in a known manner with respect to a spatial reference frame defined in FIG. 1 by I, J, and K. This also could be referred to as the "field" reference frame since the spatial axes are aligned with features of a baseball field. As used herein, the term "global reference frame" or "spatial reference frame" means a 3-dimensional space that is aligned in a known relationship with a playing field, court, batting cage, or other relevant sports environment. The bat reference frame, denoted by i, j, and k, is oriented such that its orientation with respect to the spatial frame is either known (e.g. heading angle) or can be determined from measured data (pitch and roll angles). After a swing, the motion algorithm uses the initial position and orientation information to locate and align the full 3D trajectory of the bat in the spatial frame. A drawback to this method is that while the roll and pitch angles can be determined from initial acceleration measurements, if the user fails to hold the bat in true alignment with the spatial I direction, there will be an error in the third spatial angle, i.e. heading angle. An even more consequential shortcoming is that the player must start every swing with this orientation of the bat—a time-consuming and unnatural movement that is alien to a normal swing routine.

SUMMARY OF THE INVENTION

In accordance with the presently disclosed invention, the player calibrates the initial position and orientation of the trajectory using their natural sports motion from a well-defined starting point. For example, a baseball or softball batter with mature swing mechanics maintains approximately the same bat orientation and position at the beginning of their swing. This orientation and position is unique to that player and unlike that of other players. This consistent start orientation and position is referred to herein as the player's "load configuration." The load configuration may represent the start of a swing (or other motion of interest) or it may occur at any characteristic point in time during the motion. When referred to herein as a start configuration, it is without loss of generality. Preferably, the presently disclosed invention includes a system and method for calibrating initial position and orientation of trajectory of natural sports motion from a well-defined point using an inertial motion sensor attached to an article of sports equipment or to a body segment in accordance with the user's initial orientation and location at the beginning of a sports motion. The sensor captures real-time motion data and the calibrated initial orientation and location provide absolute heading angle and starting position of the equipment or body segment in a spatial frame.

In the presently disclosed invention, the player's personal orientation and position in space is determined and then stored for subsequent use. Thus, a player need complete the calibration procedure only once. The resulting load configuration parameters may be retrieved each time that new swing data is analyzed. Unlike prior art methods, the player is not required to replicate a calibration of bat position and orientation before every swing. The presently disclosed invention recognizes features in the data to identify the load configuration, and then stores that information for use in analysis and rendering of future swings. The calibration process must be repeated only if the player changes his or her load configuration.

The disclosed method is generally applicable to sports other than baseball and softball. For example, a tennis player habitually places the racquet in certain orientations prior to and during the serve; football players attain certain orientations with the ball during the throwing motion; and baseball and softball pitchers move the ball to certain repeatable positions. Likewise, the presently disclosed invention may determine key positions and orientations for body segments as well as for equipment.

Primary steps in accordance with the disclosed method are shown in the flowchart of FIG. 2. The method includes four primary steps: user interaction and data collection, data transfer (sometimes optional), data processing, and results saving and optional transfer. Among other advantages, the disclosed method avoids unnecessary motions during normal training and play and automatically determines one or more key calibration positions and orientations (i.e. "load configurations") in the user's execution of movements that are normal to the particular user. The disclosed method can be implemented on a field or court of play (e.g. on a baseball/softball field, or in a batting cage) or wherever training or competitive activity occurs. The personalized calibration results for each user may be saved on the monitoring device in use, on a remote data storage server, on an intermediate device, or any combination of such devices. The user need only calibrate once and thereafter may retrieve the calibration results from a remote server or other device without re-calibration. Each of the steps in the flowchart of FIG. 2 is described in detail in the following description of a presently preferred embodiment of the invention.

Other advantages and objects of the presently disclosed invention will become apparent to those skilled in the art as a description of a presently preferred embodiment proceeds.

BRIEF DESCRIPTION OF THE DRAWINGS

A presently preferred embodiment of the disclosed invention is shown and described in connection with the accompanying drawings wherein:

FIG. 3 illustrates interactive steps for swing load calibration in accordance with the disclosed method;

FIG. 4A depicts a bat position and orientation in accordance with the disclosed calibration method;

FIG. 4B depicts a bat position and orientation in accordance with the disclosed calibration method;

FIG. 5A depicts alternative bat positions and orientation;

FIG. 5B depicts alternative bat positions and orientation;

FIG. 6A shows an example of calibration of a pitch motion;

FIG. 6B shows an example of calibration of a pitch motion;

FIG. 6C shows an example of calibration of a pitch motion;

FIG. 9A contrasts the rotation rate of a calibration procedure;

FIG. 9B contrasts the rotation rate of a calibration procedure;

FIG. 10A illustrates key points in a time line that correspond to motion data;

FIG. 10B illustrates key points in a time line that correspond to motion data;

FIG. 11 depicts a definition of heading angle;

FIG. 12A contrasts differences in load orientation for calibration of a bat with no swing and a bat with an active swing;

FIG. 12B contrasts differences in load orientation for calibration of a bat with no swing and a bat with an active swing;

DESCRIPTION OF A PRESENTLY PREFERRED EMBODIMENT

Figure 1:
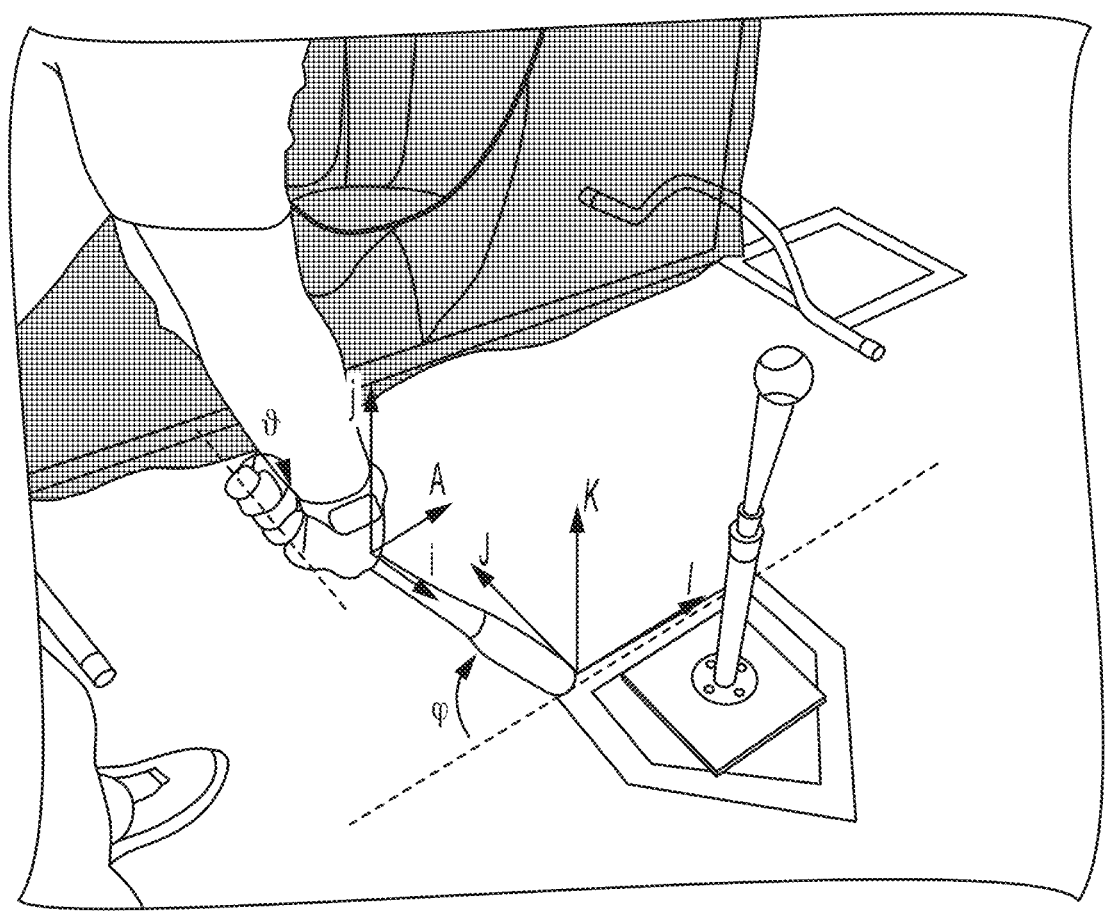
FIG. 1 illustrates a prior art example for calibrating initial orientation of sensors as applied for a baseball swing.
Figure 2:
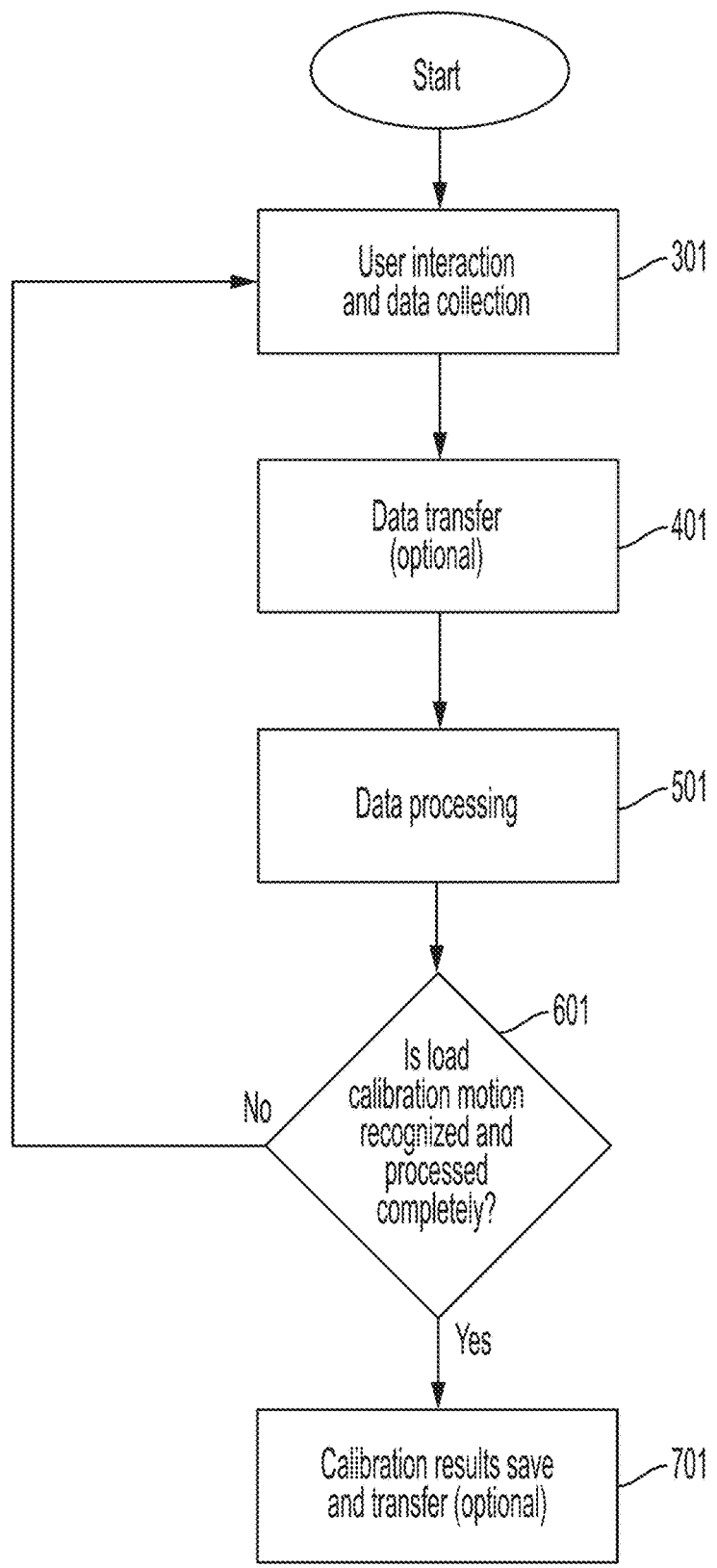
FIG. 2 is a flow diagram showing material steps in the disclosed calibration method.

User Interaction:

A presently preferred embodiment of the disclosed invention is illustrated in the flowchart of FIG. 2 wherein a first step of user interaction and data collection 301 generates data that is stored in one or more intertial sensors that may be transferred to a mobile device 401. The data is processed in a further step 501 and then analyzed for load calibration in step 601. If no load calibration is recognized and successfully processed, the method returns to step 301 and repeats the above process. If a load calibration is recognized and successfully processed at step 601, then the calibration result is saved and/or (optionally) transferred (for example to a mobile device and/or server) at step 701. The above steps are applicable with respect to any sports equipment (e.g. a baseball bat, tennis racquet, volleyball, or other equipment) or to a player's body segment (e.g. forearm, upper arm, or head). For the example of the presently preferred embodiment, the above steps are further described in detail with respect to the load calibration of a baseball bat as shown in connection with FIGS. 3-13.

In step 301 the user moves the sports equipment or the relevant body segment from a known point and orientation in the global frame through the user's unique, natural sports motion. Referring particularly to FIG. 3, the disclosed method for determining a user's personalized calibration configuration in a spatial frame includes steps 303, 305 and 307 of FIG. 3. In step 303 a sensor is attached to the sports equipment or body segment (such as to the knob of a baseball bat) and is enabled to collect data. The sensor can be enabled by manual interaction with the sensor device or through commands from a mobile device that is operated by the user or by another person. Sensor enablement may be accomplished through audio cues from the user or another person to the mobile device or the sensor device. Alternatively, sensor enablement may be triggered automatically when the sensor device recognizes a preselected stationary configuration or through timing measured from an initial start cue. In some cases the inertial sensor unit may be embedded in the equipment and/or it may automatically activate to collect data, in which case explicit user interaction may not be required for part or all of this step.

At step 305, the user places the equipment or body segment in a predetermined stationary position and orientation in the spatial or global frame. This is particularly illustrated in the example of FIG. 4 wherein the baseball bat is placed in relation to home plate. The predetermined configuration may involve placing the bat in the predetermined position and then removing one's hands. In another example, it could involve moving the bat to a known position and orientation while the user still holds it. In the baseball bat swing example described in the presently preferred embodiment, the player places the bat flat on the ground with the knob of the bat aligned with the front inside corner of home plate such that the longitudinal axis of the bat is perpendicular to a line that extends from the center of home plate to the center of the pitcher's mound.

FIG. 4 shows that the predetermined initial heading angle is different for right-handed swings (FIG. 4(*a*)) than for left-handed swings (FIG. 4(*b*). The knob position P1 (FIG. 4(*a*)) or P2 (FIG. 4(*b*)) is the sensor's initial reference position in the global frame for a right-handed or left-handed swing, respectively. While the presently preferred embodiment uses the knob position and bat orientation as described herein, this particular selection is not limiting and other known orientations and positions may also be validly used. This same generality applies with respect to sports equipment other than baseball and also to body segment applications in which many known orientations and positions may be valid. As one example, the bat may be placed along an edge of the batter's box with the longitudinal axis of the bat directed toward the pitcher such as shown in FIG. 5(*a*). In another example, the bat may be placed along an edge of the batter's box with the longitudinal axis of the bat perpendicular to a line extending from the pitcher to the catcher as illustrated in FIG. 5(*b*).

The chief requirements of the position and orientation actually used to start the calibration process according to step 305 are: (1) the relationship between the initial sensor frame and global frame is known and is incorporated in the algorithm; and (2) the player may comfortably move the sports equipment or body segment from its initial position through the normal sports motion of interest. The data processing algorithm will use features of the motion to determine the key calibration point(s). There may be certain problematic or singular orientations for the predetermined orientation. For example, in the case of the presently preferred embodiment, the longitudinal axis of the bat cannot start in a vertical orientation with arbitrary roll about its longitudinal axis because that position would prevent the heading angle from being determined.

Finally, according to step 307 the user moves the sports equipment or body segment to a starting orientation and position of the desired sports motion that is natural for the particular user and then completes the motion from that orientation and position. This sequence of motions is called the calibration motion. In the preferred embodiment, the user moves the bat from the predetermined stationary configuration and executes a normal swing. Note that the swing may be a "dry" swing (i.e. without hitting a ball) or it may be a swing with ball contact, to accommodate the situation in which the player is more comfortable. To better assure that the user experience is simple and most natural, a motion recognition algorithm is used to recognize features of desired calibration and to record that information autonomously.

Although the disclosed calibration method is not limited to baseball bat swings, the calibration motion must be specified in accordance with the nature of a specific sports motion. As another example, an inertial sensor may be attached to the forearm of a baseball player's throwing arm to track a baseball throwing motion. The required predetermined configuration of the arm can be such that the player stands facing the catcher with both feet in contact with the pitching plate, the throwing arm elbow fully extended, and the shoulder abducted to be horizontal to allow the throwing arm to point to third base. An example is shown in FIG. 6 wherein a first global frame axis is defined as D1 (pointing from the pitching plate to third base) and a second global frame axei is defined as D2 (pointing from the pitching plate to home plate).

FIG. 6(*a*) shows that the throwing arm is aligned with direction D1 in the predetermined configuration. Starting from that predetermined orientation with respect to the global frame, calibration may involve adducting the arm and flexing the elbow to the player's normal set configuration for pitching, as shown in FIG. 6(*b*) and then completing a pitching motion as shown in FIG. 6(*c*). The pitching motion may be executed with or without a ball.

In another example, a right-handed pitcher may stand facing third base with the throwing side foot adjacent to the pitching plate, the throwing arm elbow fully extended, and the shoulder abducted to be horizontal to allow the throwing arm to point to third base. As in the previous example, starting from this predetermined orientation with respect to the global frame, the calibration may also involve adducting the arm and flexing the elbow to the player's normal set configuration for pitching, or some other natural configuration, and then completing a pitching motion.

In each case, the sensor captures motion data during the entire calibration motion, and calculates the forearm configuration at the set configuration (or another identified key calibration configuration) with respect to the global frame. This calibration configuration may then be used repeatedly as the initial conditions or key data point for every subsequent pitching motion reconstruction.

Data Collection

Also as part of step 301, during the user calibration motion, the inertial sensor records linear acceleration and/or rotational velocity data and or magnetometer data and saves those readings to the sensor's on-board memory. In some cases, data may be collected for a prescheduled length of time that is sufficient to allow the user to complete their calibration motion (e.g. 5 to 10 seconds). Alternatively, data may be collected until certain motion characteristics are achieved (e.g. when the bat travels through a predetermined rotation about one of its axes, or when a certain angular rate or acceleration threshold is met). In other cases, a combination of requirements may be used to establish the data collection period.

Data Transfer

After calibration motion and data collection is completed, the acquired data may be processed different ways. In some cases, that involves transferring the data to another device such as a mobile device. Other cases involve processing the data on the same sensor device. Still other applications involve a combination of the two. For the presently preferred embodiment of step 401, after the motion is completed all collected motion data is transferred to the connected mobile device via a wireless connection. (In alternative embodiments, the data may be streamed to a mobile or other collection device in real time as the calibration motion is executed.) The mobile device checks the successful completion of data transfer and if no errors are found the disclosed method proceeds to step 501; data processing by a calibration algorithm. If the data transferred to mobile devices is incomplete (e.g. due to breaks in the wireless connection) then the mobile device may request the data transfer process to be repeated or that the motion data be processed by the same algorithm running in sensor firmware. In that case some or all of the data and results may be saved in on-board memory and be sent to a mobile device when the wireless connection is restored.

Data Processing:

The data processing algorithm may be executed entirely on the mobile device, entirely in the sensor device firmware, or on a combination of the two. Processing by the firmware could alter the point at which data transfer occurs (e.g. data transfer occurs after processing) as well as the amount of data that is transferred (e.g. only results are transferred, or only data is transferred, or a combination of data and results are transferred). In one embodiment, complete processing of data in the firmware could result in the transfer of only the final calibration configuration. In another embodiment, partial processing in the firmware (e.g. checking that motion conditions are met) may result in transfer of only a trimmed portion or subset of the data. The preferred embodiment in a particular application may depend on design requirements such as conserving a mobile device's power budget.

Figure 7:
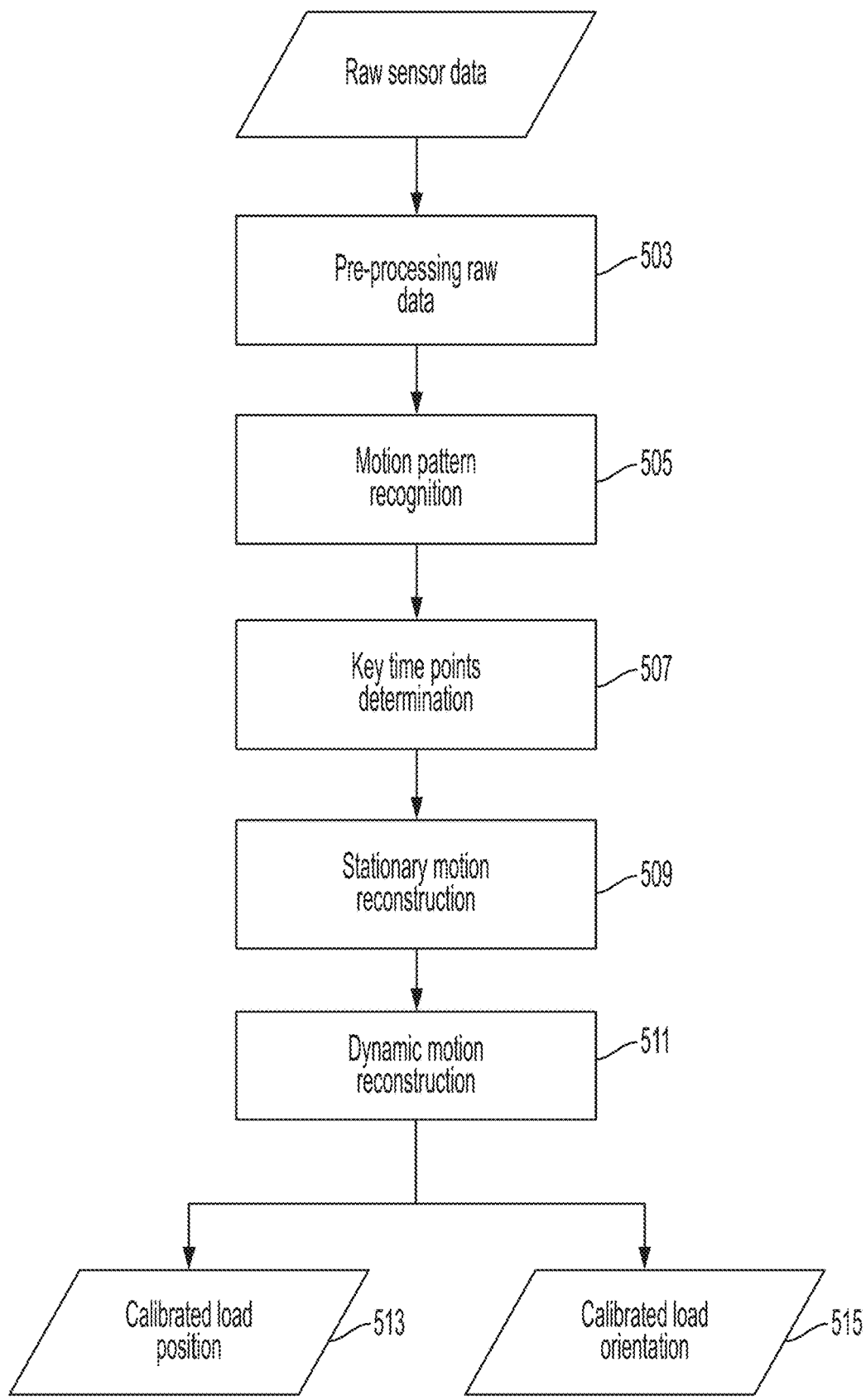
FIG. 7 is a flow diagram showing steps of a load calibration algorithm in accordance with the disclosed method.

The processing algorithm analyzes the raw motion data (acceleration and/or rate gyro data and/or magnetometer data) of the sports equipment or body segment movement that is collected by the inertial sensor during the calibration motion as previously described herein. Further details of data processing step 501 are shown and described in connection with the algorithm of the presently preferred embodiment that is shown in FIG. 7. In certain applications, one or more of the steps shown in FIG. 7 may be omitted.

Pre-Processing:

In some cases, the raw sensor data that is transferred at step 401 must be pre-processed at step 503 before further motion analysis is performed. The pre-processing step 503 may include, but is not limited to, noise filtering, bias removal, sensitivity calculation, unit conversion to physical quantities, axis alignment as well as other functions.

Motion Pattern Recognition and Key Time Points Determination:

Motion pattern recognition in step 505 is an essential part of the algorithm that is included in the disclosed method. The motion pattern recognition step 505 examines the data for certain motion features and determines key time points for further calculation at step 507. Different sports motions have different calibration motions. However, motion according to the presently disclosed invention can be described as including three primary components: a stationary period, an initial motion period, and a normal motion period.

During the stationary period, the sensor with sports equipment or body segment remains stationary at the predetermined start position and orientation. For example, the bat is laid on the ground and aligned with a predetermined orientation as previously explained herein. The initial motion period equates to moving the sensor to the player's comfortable load/set/prepare position and orientation and before executing a specific sports motion. For example, when the player picks up the bat from the ground and moves it to a comfortable position and orientation from which they can execute his or her normal baseball swing. The normal motion period is the main body of sports motion that requires calibration. In the example of the preferred embodiment, this is the player's active swing.

The forgoing three primary components for motion pattern recognition establish a framework for a motion pattern recognition algorithm that is adaptable to a broad range of sports motion without significant changes. Based on that general algorithm framework, a set of motion feature recognition rules may be designed—either by domain knowledge and/or by data driven learning algorithms. Such motion feature recognition rules identify each part of the sports motion of interest.

Figure 8:
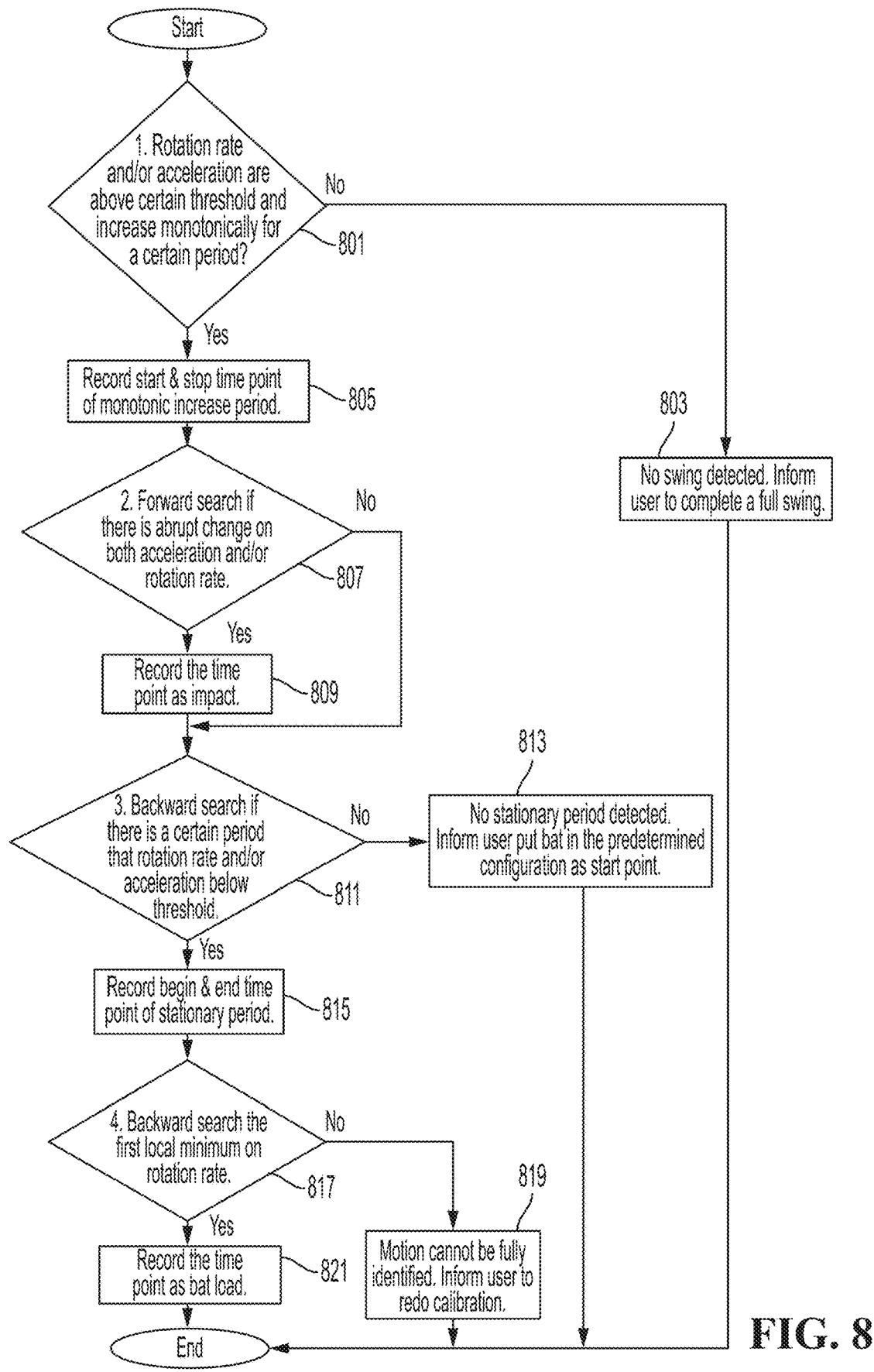
FIG. 8 is a flow diagram showing steps of motion pattern recognition as used for load calibration of a baseball swing in accordance with the disclosed method.

In accordance with the presently preferred embodiment of the disclosed invention, FIG. 8 is a flow diagram that illustrates rule sets and workflow for baseball swing calibration based on relevant knowledge and experience. Details of the rule set are explained in connection with the steps 801 through 824 of FIG. 8. The example of FIG. 8 is illustrative of the disclosed process. Specific rules and the order of steps may be different for variations of the preferred embodiment or other sports motion examples, and can be further supplemented by or replaced with a data learning method.

In step 801, the motion data is searched to identify a certain time period (e.g. 10 sample points or 50 sample points or 100 msec or 200 msec) that has one or more rotation rate value(s) and/or one or more acceleration value(s) above predefined thresholds (e.g. 5 rad/s rotational rate and/or 3 g acceleration or 2 rad/sec rotational rate and 5 g acceleration) where such values are increasing monotonically. At step 805 the identified time period is denoted as a subset of the normal motion period. Failure of this rule (i.e. no qualified period is identified) means that the raw data does not contain any swing motion and at step 803 the user is informed to complete a full swing.

Starting at the beginning of the subset of the normal motion period identified in steps 801 and 805, step 807 is a forward search for an abrupt change of rotation rate (e.g. 2.5 rad/sec^2) and/or acceleration (e.g. 3 g/sec). Such a characteristic is denoted as an impact event. This rule recognizes the motion pattern as either a swing that includes hitting a ball as recorded at step 809 or a dry swing without hitting a ball. The absence of an impact does not affect the subsequent rules and the method proceeds to step 811 irrespective of whether an impact event is recorded.

Starting at the beginning of the subset of the normal motion period identified in steps 801 and 805, step 811 is a backward search over a period (e.g. 10 sample points or 100 sample points or 100 msec or 500 msec) during which one or more rotation rate value and/or one or more acceleration value is below a certain threshold (e.g. magnitude of rotational velocity is below 0.05 rad/s). If the search yields a positive result, the period is denoted as the stationary period and recorded at step 815. If the search fails to yield a positive result, there is a failure of this rule that is interpreted to mean that the bat did not start from a resting condition and at step 813 the user is informed to place the bat in the predetermined configuration as a start point.

If the stationary period is recorded at step 815, the method proceeds to step 817 where, starting at the beginning of the subset of the normal motion period found in steps 801 and 805, there is a backward search for the local minimum of rotation rate nearest to the normal motion period. This is identified as the time of the load configuration and is recorded at step 821. Failure of a positive result from the backward search at step 817 is interpreted to mean that the initial motion (bat pick up) was performed incorrectly and, at step 819, the user is advised to repeat the calibration.

Besides the experience-driven method to design rule sets as previously explained herein, machine learning techniques can also be applied. Given a sufficiently large quantity of training data that is labeled with key time points of interest, a learning algorithm can generate a set of features and thresholds that recognizes a motion pattern and determines key time points.

Two examples of typical bat load calibration motion data are illustrated in FIG. 9. FIG. 9(a) represents the situation in which the user picks up the bat from the known configuration to a natural load configuration and then takes a dry swing without hitting a ball. FIG. 9(b) represents the situation in which the user picks up the bat from the known configuration to a natural load configuration and then takes a swing in which contact is made with a baseball.

After the motion recognition algorithm described herein processes the data, it will determine part of or all of the key time points of motion data. This will define the period when the sports equipment or body segment is in its predetermined stationary configuration (e.g. when the bat is on the ground); the moment when the sports equipment or body segment is first moved (e.g. when the bat is picked up, signifying start of initial motion); the moment when the sports equipment or body segment is in the load configuration; the moment that the user's normal motion event begins (e.g. the start of the swing); and the moment of one or more significant motion events (e.g. bat-ball impact). In a case of a dry swing or no swing, no impact will be identified. FIG. 10 illustrates the key time points corresponding to the motion data of FIG. 9. Depending on the specific sports motion of interest, other key time points and events also may be determined by a similar algorithm. In such event, the list of key points and events may be lesser or greater than found in the example of the presently disclosed embodiment.

Key time points need not coincide with transitions between the identified periods. For example, FIG. 10 shows that the bat load time does not coincide with the end of the initial motion (i.e. the beginning of the normal motion). Such key time points may be determined by features (rule-based or data-learning-based) other than those used to identify time periods.

At times when the algorithm recognizes that the user has not performed the calibration motion correctly and some key time points or periods (e.g. bat on the ground) cannot be determined, the disclosed process may be terminated and returned to the beginning of the calibration process. At that point, the user may be asked to repeat the process, as shown in steps 601 and 301 of FIG. 2.

After all of the necessary time points and segments are determined, the disclosed motion reconstruction algorithm may be executed to determine the calibration position and orientation. In the example of the preferred embodiment, the outcome may be the bat position and orientation when the batter is holding the bat in their natural load configuration.

As later described herein, the motion reconstruction algorithm includes two phases—stationary reconstruction and dynamic motion reconstruction as depicted by steps 509 and 511, respectively, of FIG. 7. A significant difference of the presently disclosed motion reconstruction process from prior methods for recreating a sports motion from inertial measurement data is that many such prior sports measurement scenarios have no known position or orientation during the motion that may define the motion in a spatial or global frame. The calibration method described herein provides a known position and orientation that may be used in motion reconstruction of subsequently measured sports motions.

Stationary Motion Reconstruction:

When the sports equipment or body segment is in the initial known position (e.g. the bat is on the ground), the initial position of the sensor in the three axes of the global frame is known. If the sensor's axes are also aligned with the global frame, then the three Euler angles are also known. Those six parameters establish initial conditions for the following dynamic motion reconstruction. In such circumstances, the stationary motion reconstruction step can be completed directly by calculating the initial quaternions in accordance with Equation 1. However, complete alignment of all axes of the sensor frame with the global frame is difficult and often not practically attainable. For example, when the baseball bat is laid on the ground, the sensor's yaw (heading) angle may be aligned with the known reference orientation (e.g. the edge of the batter's box). If the sports equipment or body segment is placed such that the remaining sensor axes align with the global frame axes (or at known offsets), then the stationary orientation may serve as exact initial conditions for subsequent calibration calculations. However, the typical circumstance is that the longitudinal axis of the bat does not fully align with the global horizontal axis because the knob of the bat has smaller diameter than the barrel of the bat. The difference in diameters causes the pitch angle to be unknown with respect to the global frame. In addition, the bat is round and can be placed on the ground at any roll angle so that the roll angle is also unknown.

During the stationary period, the accelerometer signals can be used to calibrate initial roll angle and pitch angle. When the sensor unit is stationary, only the gravitational reaction force is applied to the accelerometers. The gravitational reaction force has a known constant direction (i.e. vertically upward in the global frame) so that it can be used to determine two of the Euler angles, roll ($\phi$) and pitch ($\theta$) as shown in the first two equations of Equation (1).

$$\begin{cases} \phi = \tan^{-1}(a_y, a_z) \\ \theta = -\sin^{-1}(a_x) \end{cases} \quad (1)$$

where ($a_x$, $a_y$, $a_z$) are acceleration data on the three sensor orthogonal axes as determined by averaging the accelerometer data during the stationary period of the calibration process. The heading angle, $\psi$, is determined from the known bat orientation as:

$$\psi=0\text{(right-handed) or }\pi\text{(left-handed)} \quad (2)$$

The sensor is assumed to be rigidly connected to the sports equipment or body segment so that the roll and pitch angles of the sports equipment or body segment are known as well. The yaw angle is then determined by which known orientation is selected as reference. In the baseball application of the presently preferred embodiment, the reference orientation is defined as shown in FIG. 11. When the bat is laid on the ground as shown in FIG. 4, its orientation is 0 degrees for right-handed batters and 180 degrees for left-handed batters, as also in accordance with Equation 2.

The singularity in Euler angle sequences prevent their direct use in dynamics motion reconstruction See Diebel, J. (2006) "Representing attitude: Euler angles, unit quaternions, and rotation vectors"; *Matrix,* 58, 1-35. Instead, a quaternion method is used. The initial quaternion, an alternative format to describe stationary orientation with respect to a reference frame (i.e. the global frame of the disclosed method), is constructed from Euler angles, as shown in Equation 3:

$$q_{n=0} = \begin{bmatrix} c_{\phi/2}c_{\theta/2}c_{\psi/2} + s_{\phi/2}s_{\theta/2}s_{\psi/2} \\ -c_{\phi/2}c_{\theta/2}c_{\psi/2} + s_{\phi/2}c_{\theta/2}c_{\psi/2} \\ c_{\phi/2}s_{\theta/2}c_{\psi/2} + s_{\phi/2}c_{\theta/2}s_{\psi/2} \\ c_{\phi/2}c_{\theta/2}s_{\psi/2} - s_{\phi/2}s_{\theta/2}c_{\psi/2} \end{bmatrix} \quad (3)$$

where c and s are abbreviations of the functions cos and sin. The initial quaternion will be the start point of the subsequent dynamic motion reconstruction that is hereafter described.

Dynamic Motion Reconstruction

The dynamic motion reconstruction in step 511 of FIG. 7 follows a known method that calculates the sensor unit's as well as the sport equipment's or body segment's position and orientation from the end of the stationary period to the end of the normal motion, which includes the key time point(s) to be calibrated. In the example of the presently disclosed embodiment, the dynamic motion reconstruction calculates bat motions from the moment of bat pick-up to the end of the swing shown in FIG. 10. The position and orientation at the moment of bat load may be saved for future swing motion reconstruction.

Starting from the initial quaternion, which is obtained in Equation (3), the rate gyro measurements may be used to update the instantaneous quaternions at every sample time, as shown in Equation (4) and Equation (5).

$$\frac{d}{dt}q = \frac{1}{2}\Omega[\omega^i] \cdot q \quad (4)$$

$$\Omega[\omega^i] = \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix} \quad (5)$$

where ($\omega_x$, $\omega_y$, $\omega_z$) are the three axis rotational velocity values as measured by the gyroscope at each sample time. The result is that the orientation of the sensor, as well as that of sports equipment or body segment, is obtained throughout the dynamic period, to be saved for future swing analysis. The calibrated orientation can be saved in different but equivalent formats, such as Euler angle sequence, quaternion, or rotation matrix, for ease of swing analysis.

Using the quaternion at every sample point, the linear acceleration of the sensor (and therefore the linear acceleration of the point of sensor attachment to the sports equipment or body segment, e.g. bat knob) may be calculated in the global frame by the rotation matrix R constructed by the quaternion:

$$a_g = R_i^g \cdot a_i - G \quad (6)$$

where $a_i$ is acceleration measured by an accelerometer, expressed in the local frame of i-j-k. The effect of the matrix $R_i^g$ (obtained by Equation (7)) transforms $a_i$ to the global frame I-J-K:

$$R_i^g = \begin{bmatrix} q_0^2 + q_1^2 - q_2^2 - q_3^2 & 2q_1q_2 + 2q_0q_3 & 2q_1q_3 - 2q_0q_2 \\ 2q_1q_2 - 2q_0q_3 & q_0^2 - q_1^2 + q_2^2 - q_3^2 & 2q_2q_3 + 2q_0q_1 \\ 2q_1q_3 + 2q_0q_2 & 2q_2q_3 - 2q_0q_1 & q_0^2 - q_1^2 - q_2^2 + q_3^2 \end{bmatrix} \quad (7)$$

Then the acceleration of gravity G is subtracted to determine the linear acceleration of the sensor itself $a_g$ in the global frame. Double integration with respect to time on the linear acceleration in the global frame determines the sensor positions (e.g. bat knob positions) X-Y-Z in the three axes of the global frame throughout the dynamic period:

$$X = \iint_{t_1}^{t_2} a_g(X) dt \quad (8)$$

$$Y = \iint_{t_1}^{t_2} a_g(Y) dt \quad (9)$$

$$Z = \iint_{t_1}^{t_2} a_g(Z) dt \quad (10)$$

where $t_1$ and $t_2$ are the moment of bat pick-up and the moment of the end of the swing, respectively. The moment of bat load was found during the key time points determination step so the dynamic position and orientation data as calculated above may be searched to find the load configuration at that time point as depicted by steps 513 and 515 of the flowchart in FIG. 7. Alternatively, the dynamic motion reconstruction process may stop at the point of calibration (i.e. $t_2$=the moment of bat load) if the actual swing motion is not desired. Alternatively, other key features and/or orientations and positions may be recognized through the processing to be used as calibration configurations.

As shown in the flowchart of FIG. 2, if the steps of key time points recognition and motion reconstruction are completed successfully (i.e. the flowcharts of FIG. 7 and FIG. 8 are completed), then the initial configuration of the sports equipment (bat load in this example) is determined. These results (and any other key features, time points, and configurations) can then be stored and/or transferred.

Calibration Results Save and Transfer

Once calculated, the key features, time points, and/or configurations (the calibration results) may be stored locally (e.g. on the sensor, the mobile device, a remote server, depending on where the calculations occur) and/or the results can be transferred to another device or server. In addition, portions or all of the raw data may be stored or transferred. For the bat swing example, the results may include global positions and quaternions, Euler angles, or rotation matrix of the bat load configuration. This configuration information may be used in subsequent swings by the player to determine the bat's position and orientation in the global frame.

Players are known to repeat patterns in their motions. For example, they may start their swing from a similar bat position and orientation. Thus, the configuration results may be used to define future swings in the global frame. In one or more future swings that are measured by inertial sensors, a rule-based method (such as the method herein disclosed or an alternate method that would be apparent to those skilled in the art) or data-learning method may be used to identify a corresponding bat load time point in the swing data. The load configuration results determined here may be used to place that swing at a known global position and orientation at the point of bat load. Starting at that time point, the dynamic motion reconstruction algorithm previously disclosed herein or variations of other known algorithms may be used to compute the swing motion forward and backward in time from the bat load time. Thus, the presently disclosed method provides a known orientation and position of the body in the global frame.

Benefit of the Disclosed Method

To illustrate the advantage of the presently disclosed method, the disclosed method may be compared to a variation of the disclosed method wherein, instead of executing a normal motion, the player is required to hold the perceived calibration configuration (that is, no normal swing is executed). As shown in FIG. 12, a player picked up a bat from its predetermined position and then moved it to the perceived natural start point for the swing. To enable the algorithm to recognize the movement and subsequent hold period, the player then held the bat in the position illustrated in the left photograph in FIG. 12) for a period of approximately 1-4 seconds. The algorithm computed the hold orientation and hold position, which together made up the load configuration, from the motion measurements collected during the calibration process. This method does not involve a normal sports motion (bat swing in this case). Instead, it relies on the player to perceive the proper calibration configuration. Such reliance can result in a significant difference between the calibrated load configuration and the actual start point in a normal sports motion. Because many players do not normally move into a load configuration and hold it for an extended period of time (the 1-4 seconds used in the calibration method described above), the load configuration position determined with this method often has been found to be substantially different from the actual start point. That is shown in FIG. 12 where the left and right photographs show calibrated and actual load configurations, respectively. The difference between these two configurations would be unknown if only the first method (no swing) is used, and the unknown difference introduces inaccuracy into 3D rendering of bat trajectory.

Figure 13A:
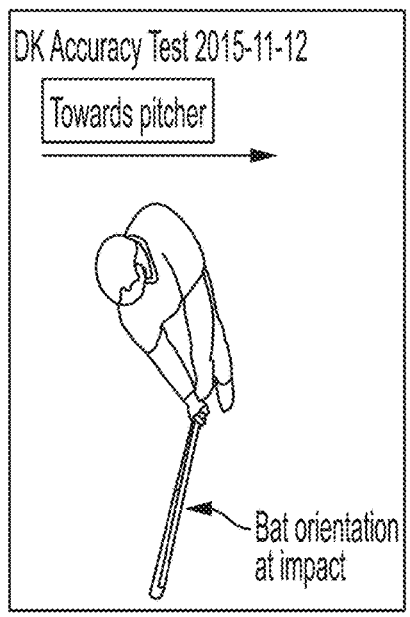
FIG. 13A demonstrates a 3D comparison of bat trajectories.
Figure 13B:
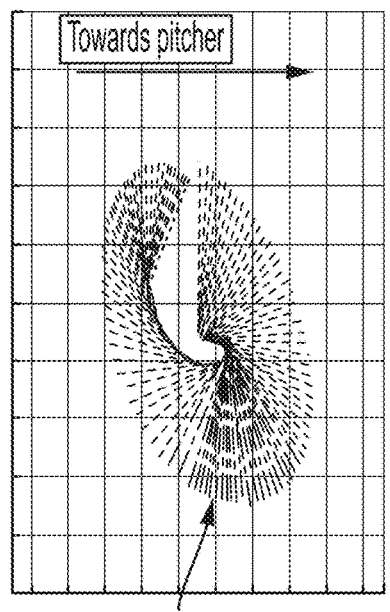
FIG. 13B demonstrates a 3D comparison of bat trajectories.
Figure 13C:
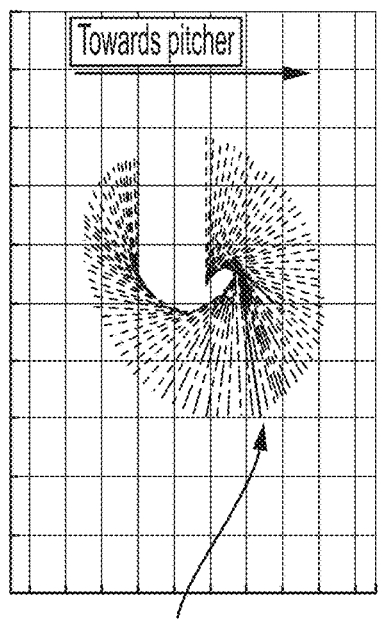
FIG. 13C demonstrates a 3D comparison of bat trajectories.

The improvement of the process herein disclosed may be demonstrated in FIG. 13. FIG. 13(a) shows a top view of baseball swing at impact with the bat orientation highlighted. FIG. 13(b) shows a bat trajectory rendering (calculated from inertial measurement data) using the calibrated configuration according to the method herein described in which the calibration involves a normal swing motion and the calibration configuration is automatically found by feature recognition. FIG. 13(c) shows the bat trajectory using the initial configuration calibrated by the pick-up and hold method (i.e. with no swing). The bat orientation at impact in FIG. 13(b) has much higher fidelity to the actual impact orientation shown in the photograph of FIG. 13(a). This illustrates the value in extracting key calibration information from a normal sports motion and shows that the disclosed method may improve the 3D rendering accuracy of sports motion captured by inertial sensors.

While a presently preferred embodiment of the disclosed invention is shown and described herein, those who are skilled in the art will appreciate that other embodiments are also within the scope of the following claims.

We claim:

1. A method for calibrating and using a load configuration for a sports implement or an anatomical feature, said method comprising the steps of:
    a.) collecting data corresponding to positions and orientations of said sports implement or anatomical movement of said subject relative to a known position and orientation of said sports implement or anatomical movement of said subject, said data being collected over the movement of said sports implement or the anatomical movement of a subject during their use of said sports implement;
    b.) calibrating a load configuration for the sports implement or anatomical movement by searching data of said collecting step and identifying data that corresponds to a selected rate of movement of said sports implement or a selected rate of anatomical movement of said subject that is consistent for repeated motions of said sports implement or said anatomical movement of said subject; and
    c.) using said load configuration to analyze the position and orientation of the sports implement or the anatomical movement of said subject that occur subsequent to or prior to or both subsequent to and prior to said load configuration.

2. The method of claim 1 wherein the step of calibrating said load configuration is performed by recognizing data features that correspond to the selected position and orientation of said sports implement or anatomical movement of said subject of said load configuration.

3. The method of claim 1 wherein said load configuration corresponds to a given orientation and position of said sports implement or said anatomical movement of said subject during the movement of the sports implement or the anatomical movement.

4. The method of claim 3 wherein the load configuration is determined relative to a spatial reference frame.

5. The method of claim 4 wherein said step a of collecting data includes the use of an inertial sensor.

6. The method of claim 5 wherein said inertial sensor is attached to said sports implement or to an anatomical feature.

7. The method of claim 6 wherein said sports implement or said anatomical feature is placed in predetermined stationary position and orientation in said spatial reference frame.

8. The method of claim 7 wherein the predetermined stationary position and orientation are fixed and known with respect to the spatial reference frame.

9. The method of claim 8 wherein said relationship between the predetermined stationary position and orientation of said sports implement or said anatomical feature are included in a process for determining said load configuration.

10. The method of claim 9 wherein said sports implement or anatomical feature are moveable from the fixed, known position through said motion of said sports implement or the anatomical movement of said subject during their use of said sports implement.

11. The method of claim 10 wherein said user moves said sports implement or anatomical feature from the known, fixed position to a starting orientation and position that is comfortable to said user.

12. The method of claim 11 wherein said step b of calibrating said load configuration within the motion of said sports implement or anatomical movement of said subject includes motion feature recognition rules that correspond to components in a motion pattern.

13. The method of claim 11 wherein said step b of calibrating said load configuration within the motion of said sports implement or anatomical movement of said subject includes machine learning methods.

14. The method of claim 11 wherein said step b of calibrating said load configuration within the motion of said sports implement or anatomical movement of said subject defines:

a.) a period when said sports implement or anatomical feature is in a predetermined, stationary position;
b.) a time when said sports implement or anatomical feature is first moved from the predetermined, stationary position, c.) a time when said sports implement or anatomical feature is in the load configuration;
d.) a time that normal movement of said user begins, and e.) a time of one or more significant motion events that occur during said normal movement of said user.

15. The method of claim 14 further comprising a motion reconstruction process that determines a calibration position and orientation.

16. The method of claim 15 wherein said motion reconstruction process includes the steps of:
    a.) stationary reconstruction; and
    b.) dynamic motion reconstruction.

\* \* \* \* \*